June 18, 1957
C. A. BOTHA
2,796,012
SUBSOILER ATTACHMENT
Filed Feb. 26, 1953
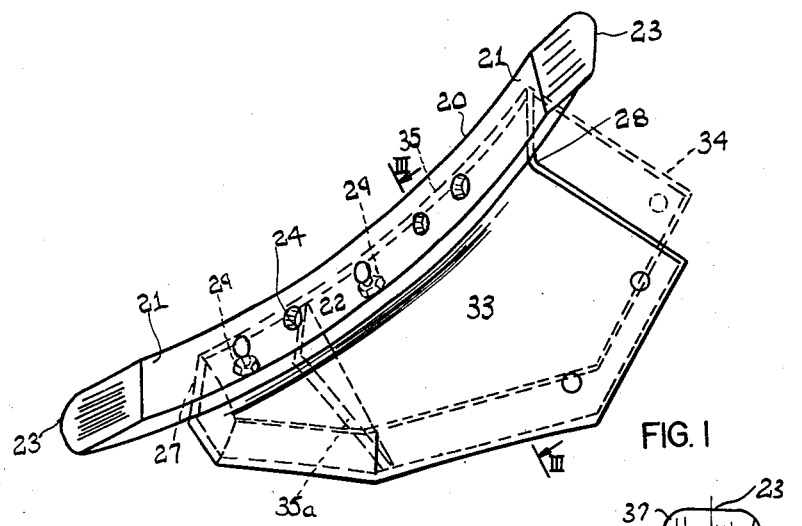
FIG. 1
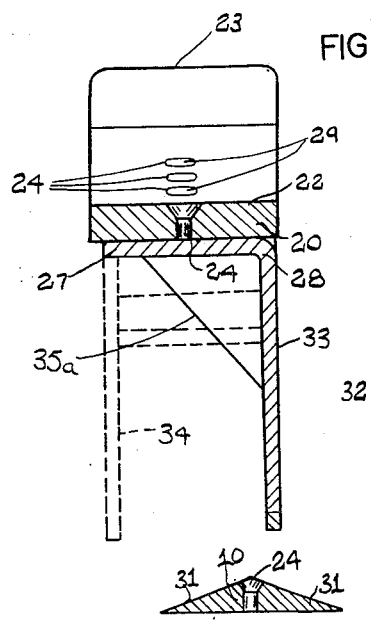
FIG. 3
FIG. 4
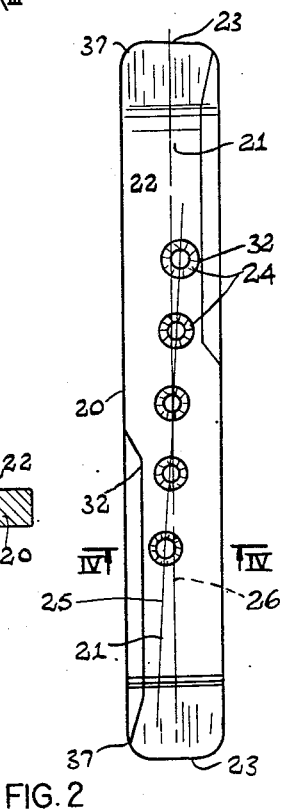
FIG. 5
FIG. 2

2,796,012
Patented June 18, 1957

UNITED STATES PATENT OFFICE

2,796,012

SUBSOILER ATTACHMENT

Casper A. Botha, Kliprand, Transvaal, Union of South Africa

Application February 26, 1953, Serial No. 339,075

Claims priority, application Union of South Africa March 10, 1952

2 Claims. (Cl. 97—78)

This invention relates to the share of a deep tillage implement or subsoiler for operation in almost any kind of soil and under varying operating conditions for breaking the hard pan usually encountered in soil fromations at varying distances below the soil surface. The said hard pan is often too hard for penetration of plant roots and retards moisture absorption deeply below the soil surface and is invariably not broken up by the known kinds of ploughs, more particularly the mouldboard kind of plough. The operation of the mould-board plough is in fact one of the causes of hard pan formation and once the pan is formed such ploughs merely slide on said hard pan.

An object of this invention is to provide a subsoiler share of simple and inexpensive construction for breaking up of the said hard pan.

Another object is to provide a subsoiler share which, as a result of rapid wear to which it is subjected, is easily and readily maintained in a sharp condition.

A further object of this invention is to provide a subsoiler share which is readily fitted to almost any standard mould-board or like plough whereby such plough is converted into a dual purpose implement by merely replacing the standard mould-board share and frog by the subsoiler share and frog according to this invention.

A still further object of this invention is to provide a subsoiler share which in operation requires less draught power than is required for implements provided with subsoiler shares as at present in general use.

Yet another object is to provide a share which ploughs and subsoils at the same time and which can and does break up the ground or soil when the latter is so dry and hard that no known plough can plough it, thereby enabling the agriculturist to plough all the year round and not limit his ploughing to the times when the soil is damp or moist so that ploughing can be done in off-seasons.

A still further object is to provide a share whereby the usefulness of the tractor and the plough structure is increased with resultant increased food production per season without extra equipment.

A still further object is to provide a share which, when fitted to a known plough structure, enables the plough to penetrate into the soil at least twice as deep as the ordinary or known ploughs.

With the above and other objects in view, which will appear as the description proceeds, the invention resides in the particular shaping, combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings:

Figure 1 is an oblique view of a preferred form of construction of a subsoiler share and frog according to this invention;

Figure 2 is a view in direction II of Figure 1 but of the subsoiler share only;

Figure 3 is a cross-section on line III—III of Figure 1;

Figure 4 is a cross-section on the line IV—IV of Fig. 2 showing a modified form of the subsoiler share; and Figure 5 is a view similar to Figure 3 showing a still further modified cross-sectional form of the subsoiler share.

The subsoiler share 20, which forms the subject matter of this application, comprises a rectangularly cross-sectioned metallic curved bar of which both ends 21 are chamfered or bevelled off from the concave face 22 outwardly to form transverse cutting edges 23.

In the intermediate or center part of each subsoiler share 20 a plurality of equidistantly spaced holes 24 are provided which are arranged along a straight line 25 which in turn is slightly obliquely disposed with respect to the longitudinal center line 26 of the bar 20 in order to provide a slight "toe-in" of the subsoiler share towards the land side. Said oblique location of the bolt holes 24 with respect to the center line 26 of the subsoiler share 20, and consequently with respect to the frog 28 and the plough beam, ensures the said toe-in and such toe-in should be approximately 2½°. In Figure 2 the said angle is exaggerated for explanatory purposes only.

The frog 28 is provided with a curved share bar fixing flange 27 which in turn is provided with two spaced radial holes and if desired with a fixed locating pin or projection located preferably between the said bolt holes. The fixing of the share 20 to the flange 27 is by means of bolts 29, passing through corresponding holes 24 in the share 20 fixing flange 27. Said method of fixing affords reversibility and advancement of the share 20 on the frog 28. Such advanceable fixing of the share 20 is step by step until the maximum advanced position is reached. After wear of the share 20 when in the fully advanced position said bar is reversed and step by step advancing continues as wear takes place. From time to time the share bar may be removed and resharpened by forging, grinding or any other suitable method. In practice the subsoiler share bar may be reversed on the land when one end thereof is dulled while on dulling of both ends the share bar is removed and both ends resharpened.

In order that the subsoiler share 20 may be provided with oblique surfaces on the forwardly directed face the longitudinal curved edges and the concave face may be bevelled substantially as shown at 31 in Figure 5. Preferably only one edge, i. e. the edge opposite to the land side, of the share is bevelled as at 32, Figure 2 and 4, so that opposite half parts of said curved longitudinal edges are bevelled or chamfered to permit reversability of the share 20. However, such bevelling is not essential and need not be effected.

The frog 28 which provides a single web 33, forming a fixing section whereby the frog is fixed to the end of a plough beam after removal therefrom of the mould-board share frog. The frog may be provided with an additional web 34 for supporting the free edge 35 of the flange 27. Said additional side plate or web 34 is also fixed to the plough beam.

Preferably, in the case of a frog having only one web, the flange is strengthened by a gusset 35a extending between the said flange 27 and the web 33 and is located at a position forwardly of the end of the plough beam when said frog is in its operative position on the plough beam.

The corners of the cutting edges 23 are preferably either bevelled or rounded off as at 37. A small slide plate may be provided adjacent the rear end of the frog if such a slide is found necessary.

The under or bottom edge or edges of the web 33 or webs 33 and 34 of the frog 28 is/are preferably curved or cut to extend upwardly from a position rearwardly of the front tip of such frog for a saving of the material in manufacture. The bevelled or chamfered ends 21 of the curved share 20 are conveniently formed by cutting the bars from which such shares are manufactured obliquely from the stock bars so that the sharpening surfaces are on the concave or upper faces of the curved bars thus forming substantially straight cutting edges.

I claim:

1. A subsoiler adapted to be mounted on the beam of a standard plough in place of a mold board plough share comprising a reversible curved bar share of rectangular cross-sectional shape bevelled in respect of both its ends from the concave face outwardly forming transverse cutting edges on both ends, a frog having a section for coupling to a plough beam and a curved bar share receiving flange of a curvature corresponding to the convex face of said bar share, a plurality of equally spaced radial holes in said bar share and two radial holes in the curved bar share receiving flange of the frog spaced at double the spacing of the bar share holes, bar share coupling bolts passing through said bar share receiving flange holes and two holes in the bar share corresponding with the holes in the bar share receiving flange permitting advancement of the bar share in steps along the bar share receiving flange, said holes of the bar share being disposed along a straight line obliquely disposed relative to the longitudinal center line of the curved bar share providing a toe-in of the operating forwardly directed end of the bar share.

2. A subsoiler as defined in claim 1, in which the bar share receiving flange of the frog provides a strengthening gusset extending between the convex face of such flange and the plough beam coupling section of such frog at a position forwardly of the front end of the plough beam.

References Cited in the file of this patent

UNITED STATES PATENTS

| | | |
|---|---|---|
| 397,415 | Caldwell | Feb. 5, 1889 |
| 601,904 | Pike | Apr. 5, 1898 |
| 1,099,304 | Katterhenry | June 9, 1914 |
| 1,641,050 | Ramsey | Aug. 30, 1927 |
| 1,914,731 | Stewart | June 2, 1933 |
| 2,142,919 | Richwine | Jan. 3, 1939 |
| 2,306,930 | Bolf | Dec. 29, 1942 |
| 2,312,371 | Strandlund | Nov. 2, 1943 |
| 2,467,289 | Beckstrom | Apr. 12, 1949 |

FOREIGN PATENTS

| | | |
|---|---|---|
| 22,453/29 | Australia | Sept. 17, 1930 |